March 20, 1951 A. ELLETT ET AL 2,545,770

CODED-SIGNAL RECEIVER WITH REVERTIVE SIGNALING

Filed March 26, 1949 2 Sheets-Sheet 1

ALEXANDER ELLETT
MALCOLM M. HUBBARD
INVENTOR.

BY Bruce [signature]

THEIR AGENT

March 20, 1951 A. ELLETT ET AL 2,545,770

CODED-SIGNAL RECEIVER WITH REVERTIVE SIGNALING

Filed March 26, 1949 2 Sheets-Sheet 2

ALEXANDER ELLETT
MALCOLM M. HUBBARD
*INVENTOR.*

BY

THEIR AGENT

Patented Mar. 20, 1951 2,545,770

UNITED STATES PATENT OFFICE 2,545,770

CODED-SIGNAL RECEIVER WITH REVERTIVE SIGNALING

Alexander Ellett, River Forest, Ill., and Malcolm M. Hubbard, Marblehead, Mass., assignors to Zenith Radio Corporation, a corporation of Illinois Application March 26, 1949, Serial No. 83,622

11 Claims. (Cl. 178—5.1)

Figure 1:
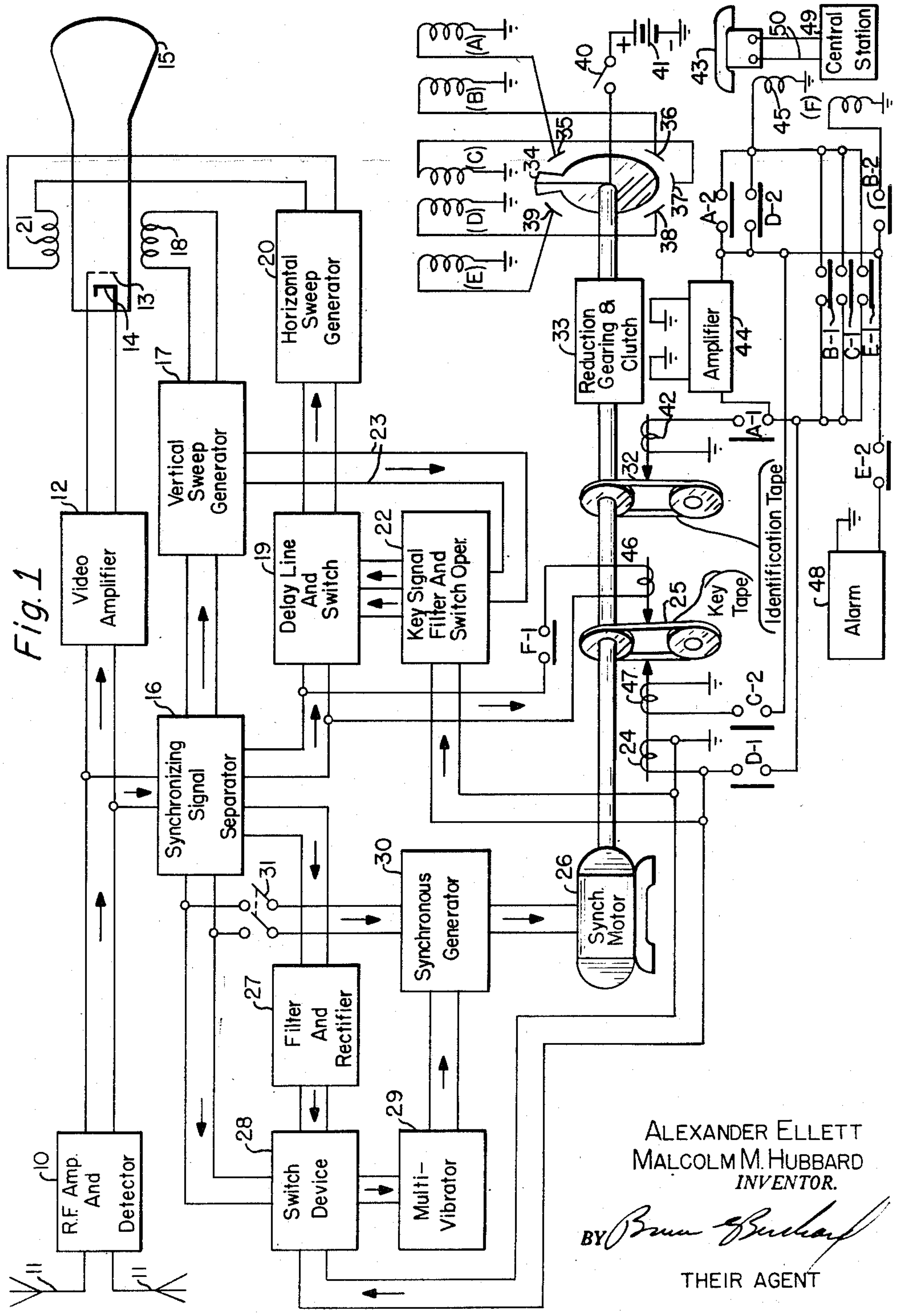

This invention relates to subscription type signal receiving apparatus, and more particularly, to such apparatus in which coded electrical signals are received over one channel and key signals for decoding the electrical signals are received solely by authorized subscribers over a second channel.

Copending application Serial Number 742,374, filed April 18, 1947, entitled "Radio Wire Signalling System" by Alexander Ellett et al., now issued as United States Patent No. 2,510,046, dated May 30, 1950, and copending application Serial Number 773,848, filed September 13, 1947, entitled "Image Transmission System" by Erwin M. Roschke, both of which applications are assigned to the present assignee, describe coded electrical signalling systems of the subscription type. In these systems, coded program signals are radiated and key signals for decoding the coded signals are distributed to subscriber's receivers over suitable wire line conductors. In such systems, the key signals are transmitted continuously over these wire line conductors to the subscriber receivers throughout the entire program interval.

Copending application Serial Number 75,988, filed February 12, 1949, entitled "Subscriber Signalling System" by Roswell H. Herrick et al., which application is assigned to the same assignee as the present application, discloses a subscriber system wherein sufficient key signal information for decoding the coded electrical signals for a relatively long period of time is transmitted to authorized subscriber receivers within a time interval short relative to the program interval. With this system, when a telephone network is used for the distribution of the key signals, a subscriber may obtain by means of a short telephone call sufficient information in the form of a key signal pattern to enable his receiver to decode the coded signals throughout a relatively long program interval. The key signal pattern is stored at the receiver and is used recurrently throughout the program interval to decode the coded transmitted signal thereby to provide intelligible image reproduction.

In either of the subscriber type signalling systems mentioned above, it is necessary that the key signals be metered, as at a central station, in order that appropriate charges may be billed to the subscribers receiving the key signals. In this connection, it is also desirable to provide some means of positive identification, not susceptible to falsification on the part of dishonest subscribers, of each subscriber as he calls the central station to request receipt of the key signals required for proper use of subscription telecasts. The central station, upon positively identifying the subscriber, may then check to determine the credit standing of that subscriber before furnishing the key signal.

It is, therefore, an important object of the present invention to provide a subscription type signal receiver embodying a system for establishing positive identification of a subscriber requesting the key signal.

It is a further object of the present invention to provide a system for establishing such positive subscriber identification automatically in a minimum amount of time during the subscriber's telephone call to the central station.

Still another object of the invention is to provide apparatus, either controllable by the receiver or by the central station, for effecting an automatic sequence of operations including positive identification of the subscriber, conditioning of the receiver for the reception of the key signal from the central station, transmission of the key signal to the subscriber, and automatic termination of the call.

In particular, in a system of the type disclosed in the above-mentioned Herrick et al. application, wherein a repetitive key-signal pattern is stored in the receiver to effect decoding throughout a relatively long program interval, it is desirable to provide some method of insuring that a subscriber who has requested the key-signal pattern and to whom that pattern has been transmitted has properly recorded it.

It is, therefore, a further object of the present invention to provide apparatus, controllable either by the receiver or by the central station, for automatically verifying the key-signal pattern recorded at the receiver.

The present invention provides a subscription type of signal receiver for utilizing an electrical signal coded in accordance with a predetermined code schedule and received over a first signal channel and for utilizing a key signal representing that code schedule received from a central station over a second signal channel. The receiver includes a reproducing device together with apparatus for supplying the coded electrical signal thereto. A decoding device is coupled to the signal-supplying apparatus for changing the mode of operation thereof in response to an applied decoding signal. The receiver is supplied with a signal storage device having a recorded identification signal, and scanning apparatus is provided for scanning the storage device to transmit the identification signal to the central station over the second signal channel. The receiver is also provided with a switching device for decoupling the storage device-scanning apparatus from the second channel and for effectively coupling the decoding device to the second channel after transmission of the identification signal to the central station.

Figure 2:
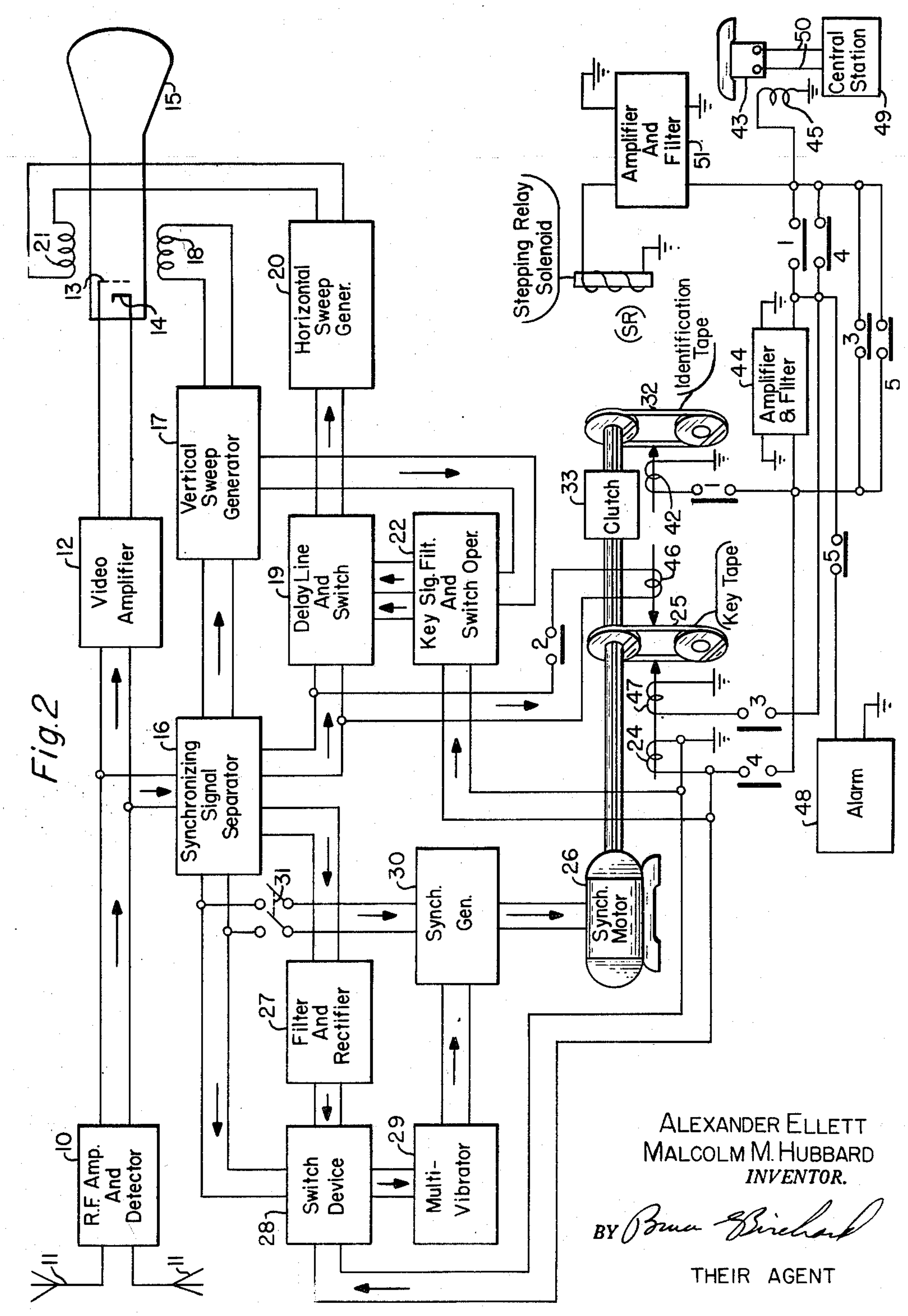

The features of the present invention which are believed to be novel are set forth with particularity in the appended claims. The invention, together with further objects and advantages thereof, may more readily be understood, however, by reference to the following description taken in connection with the accompanying drawings, in the several figures of which like reference numerals indicate like elements, and in which:

Figure 1 is a schematic diagram of a subscription type signal receiver constructed in accordance with the present invention, and Figure 2 is a schematic diagram of another embodiment of the invention.

There is shown in Figure 1, in schematic form, a subscription type receiver for receiving and decoding a composite television signal of the type transmitted by the subscription system shown and described in the aforementioned application of Roswell H. Herrick et al. The receiver comprises radio-frequency amplifier and detector stages 10 which may be coupled to any suitable antenna 11. Amplifier and detector stages 10 are coupled through a video amplifier 12 of any desired number of stages to the input circuit, comprising a control electrode or grid 13 and a cathode 14, of a conventional image tube or signal-reproducing device 15. Synchronizing-signal components of the received composite television signal are separated therefrom by means of a synchronizing-signal separator 16 coupled to the output terminals of amplifier and detector stages 10 and further coupled to a vertical sweep generator 17 which delivers appropriate scanning signals to the vertical deflection or scanning coils 18 associated with image-reproducing device 15. Synchronizing-signal separator 16 is also coupled through a delay line and switch 19 to a horizontal sweep generator 20 which supplies scanning signals to the horizontal deflection or scanning coils 21 associated with image-reproducing device 15. Delay line and switch 19 is controlled by means of a key-signal filter and switch operator 22, the latter being coupled to delay line and switch 19 by means of a set of three leads. Vertical synchronizing pulses from vertical sweep generator 17 are supplied to the key-signal filter and switch operator 22 by means of a pair of leads 23, and another input circuit of the key-signal filter and switch operator 22 is connected to a pickup device 24 associated with a magnetic tape 25 hereinafter designated the key tape, or other suitable signal-storage device, such as a magnetic disc, a memory tube, or the like.

Key tape 25 is driven by a synchronous motor 26 which is energized by the vertical-synchronizing signals from synchronizing-signal separator 16 through a filter and rectifier 27, a switch device 28, a multivibrator 29, and a synchronous generator 30. Synchronizing-signal separator 16 is also coupled directly to switch device 28, as is pickup device 24 associated with key tape 25. Alternatively, synchronous motor 26 may be energized through a switch 31 connected in series directly between synchronizing-signal separator 16 and synchronous generator 30.

The receiver described thus far is substantially identical with that described in the aforementioned Herrick et al. application. The construction of the various circuit components forms no part of the present invention and is therefore not here described in detail. Reference may be made to the Herrick et al. application and to the other previously mentioned copending applications for a detailed disclosure of operative embodiments of the individual circuit components.

Synchronous motor 26 also drives a second magnetic tape 32, hereinafter termed the identification tape, and, through a reduction gearing and clutch mechanism 33, it actuates a switching device comprising a rotating contact or wiper 34 and a series of stationary contacts 35—39. Rotating contact 34 is connected to ground through a switch 40 and a relay energizing battery 41. Stationary contacts 35—39 are individually connected to ground through the operating coils of relays A, B, C, D and E, respectively. For convenience, switch 31, clutch mechanism 33, and switch 40 may all be ganged for unicontrol operation.

A pickup device 42 associated with identification tape 32 is coupled to the subscriber's telephone hand-set 43 through the normally open contacts A—1 of relay A, an amplifier 44, normally open contacts A—2 of relay A, and an inductance coil 45 coupled inductively to the voice coil (not shown) of hand-set 43.

Telephone hand-set 43 is also coupled through coil 45, normally open contacts B—1 of relay B, amplifier 44, normally open contacts B—2 of relay B, and the operating coil of relay F, to ground. The normally open contacts F—1 of relay F are connected between the horizontal synchronizing-signal output from synchronizing-signal separator 16 and an erasing device 46 associated with key tape 25.

Telephone hand-set 43 is further coupled to a recording device 47 associated with key tape 25 through normally open contacts C—1 of relay C, amplifier 44, and normally open contacts C—2 of relay C. Pickup device 24 associated with key tape 25 is coupled to hand-set 43 through normally open contacts D—1 of relay D, amplifier 44, normally open contacts D—2 of relay D, and coil 45. Telephone hand-set 43 is also coupled to an alarm circuit 48 through coupling coil 45, normally open contacts E—1 of relay E, amplifier 44, and normally open contacts E—2 of relay E. Telephone hand-set 43 is directly connected to a central station 49, as for example by wire line conductors 50. Central station 49 may comprise a central distributing point of a telephone network, a private branch exchange at the television transmitter, or other central control station.

In operation, a coded composite television signal, of the type broadcast by a transmitter such as that described in the aforementioned Herrick et al. application, is received by antenna 11 and selected, amplified, and detected in receiver stages 10. The video-frequency components of the detected signal are amplified by video amplifier 12 and are impressed upon the input circuit of image-reproducing device 15, thereby to intensity modulate the electron beam of that device in the usual manner. The synchronizing-signal components are separated from the detected composite television signal in separator stage 16, and the vertical-synchronizing pulses are employed to synchronize vertical sweep generator 17 with the received signal. The output signal of vertical sweep generator 17 is employed as the vertical-scanning voltage and is applied to vertical-scanning coils 18 to provide vertical sweep for image tube 15. The horizontal-synchronizing pulses from synchronizing-signal separator 16 are supplied to the horizontal-sweep generator 20 through delay line and switch 19 which operates in two positions or modes, as described in the aforementioned copending applications, to pass the horizontal-synchronizing pulses undelayed in one mode and to delay the passage of these pulses in the other mode. The output signal of horizontal-sweep generator 20 is applied to horizontal deflection coils 21 to provide horizontal scanning for the electron beam of image reproducing device 15. Delay line and switch 19 is switched from one mode to another by the key-signal filter and switch operator 22, the latter being responsive to the coincidence of key signals from key tape 25 and vertical-blanking pulses from vertical sweep generator 17. Key-signal filter and switch operator 22 is sharply tuned to be selective to signals from key tape 25 of the frequency of each key signal burst and to discriminate against other signal frequencies. As fully described in the aforementioned copending applications, when the key-signal applied to key-signal filter and switch operator 22 is properly timed with relation to the key-signal employed to code the composite signal at the transmitter, delay line and switch 19 of the receiver is operated in synchronism and in the proper sense with respect to the coding apparatus located at the transmitter, and decoding is effected. Under these conditions, image-reproducing device 15 reproduces an intelligible decoded signal.

Assume, for purposes of illustration, that the subscriber owning the receiver of Figure 1 does not have the proper key signal pattern stored on key tape 25, and that he wishes to decode a particular television program signal. The subscriber closes switch 31, applying vertical-synchronizing pulses to synchronous generator 30 and thereby driving synchronous motor 26 at the appropriate speed. At the same time, the subscriber operates reduction gearing and clutch mechanism 33 to engage the switching device and set wiper 34 in rotation. Furthermore, the subscriber closes switch 40 to supply relay operating current from battery 41 to rotating contact 34. Of course where units 31, 33 and 40 are unicontrolled, as previously described, these steps are accomplished simultaneously and upon the actuation of a single control device. The subscriber then places a telephone call from his hand-set 43 to the central station 49, the latter being either manually operated or automatic and per se constituting no part of the present invention.

When rotating contact 34 engages stationary contact 35, current flows through the operating coil of relay A, causing contacts A—1 and A—2 to be closed. Operation of these contacts places pick up head 42 in circuit with coil 45. As the identification tape 32 is driven, it is scanned by the pickup head 42 to derive a coded identification signal assigned to the particular receiver. This identification signal is induced in the circuit of the hand-set 43 via coupling coil 45 and is transmitted to central station 49 over telephone lines 50.

The identification signal recorded on identification tape 32 may be of any one of a number of forms or types. For example, if a four-digit decimal code number is employed, the identification signal may comprise a series of marks and spaces representing successively each digit of the identification number in accordance with a predetermined schedule. It has been found particularly desirable to employ a four period decimal code of this type in order that certain automatic traffic equipment may be employed for checking the subscriber's identification number in a minimum time interval. Such automatic equipment constitutes no part of the present invention, but reference may be had to the copending application of Malcolm M. Hubbard, Serial No. 89,069, filed April 22, 1949 for "Automatic Traffic Equipment" and assigned to the same assignee as the present application, for a disclosure of automatic traffic equipment which affords great advantage in this connection. It is to be understood however, that other methods may be used to represent the subscriber's identification as a signal recorded on the identification tape, and that the identification signal may be checked at the central station in any manner which may seem desirable. The time duration of the electrical contact between rotating contact 34 and stationary contact 35 is adjusted to be such as to insure that the entire identification signal from identification tape 32 is transmitted to the central station 49. For example, this contact may be maintained for a time sufficient for two complete revolutions of tape 32. Rotating contact 34 then breaks connection with stationary contact 35, deenergizing relay A and removing the identification signal from telephone lines 50. During the time that rotary contact 34 is passing between stationary contacts 35 and 36, the identification signal may be checked at central station 49 in any suitable manner. The credit standing of the subscriber may be determined, and a charge or billing record may be made.

When rotating contact 34 makes electrical connection with stationary contact 36, relay B is energized, thus closing contacts B—1 and B—2. At this time, a characteristic tone transmitted by the central station 49 is received over telephone lines 50 at the telephone hand-set 43. This tone is coupled through coil 45, closed contacts B—1, amplifier 44, and closed contacts B—2 to energize the operating coil of relay F. Energization of relay F operates contacts F—1, impressing the horizontal-synchronizing pulses from synchronizing-signal separator 16 on erasing head 46, thereby to clear the key tape 25 preparatory to reception and storage of the requested key-signal pattern. Alternatively contacts F—1 may be connected in circuit between erasing head 46 and a separate erasing-signal source (not shown). Contacts 34 and 36 are designed to maintain electrical connection sufficiently long that the erasing signal is able to eradicate any signal previously recorded on any portion of the key tape 25. When rotating contact 34 passes stationary contact 36, relay B and relay F are successively deenergized, and the erasing signal is removed from erasing head 46 by the opening of contacts F—1. It is particularly desirable to make the application of an erasing signal to erasing head 46 for conditioning key tape 25 to record the key-signal pattern responsive to a pilot signal from central station 49, in order that it may be impossible for a subscriber inadvertently to erase a recorded key signal pattern before or during the program for which its use is required to obtain intelligible reproduction of the coded program signals, as by the closing of a switch by a child at play.

Assuming that the central station, after receipt of the subscribers identification, has been satisfied that the subscriber is in good standing, the key-signal pattern requested by the subscriber in the 'phone conversation with the central-office operator is now placed on the telephone lines 50. When rotating contact 34 engages stationary contact 37, the operating coil of relay C is energized, closing contacts C—1 and C—2. The key-signal pattern received over telephone lines 50 is thus repeated through amplifier 44 to the recording head 47 associated with key tape 25, and the key-signal pattern is recorded on the key tape. Again, contacts 34 and 37 are so designed as to maintain electrical connection for a sufficient interval to allow the entire key-signal pattern to be recorded on key tape 25. Rotating contact 34 then passes stationary contact 37, relay C is deenergized, and the central station 49 removes the key-signal pattern from the telephone lines 50.

Rotating contact 34 next engages stationary contact 38, energizing the operating coil of relay D and operating contacts D—1 and D—2. Operation of these contacts impresses the key-signal pattern picked up from key tape 25 by pickup head 24 through amplifier 44 and coupling coil 45 to the telephone lines 50 and thence to central station 49, where the recorded key-signal pattern is verified with the correct key-signal pattern, as by means of a coincidence circuit or the like. In this manner, the subscriber may be assured that the correct key-signal pattern is properly recorded on his key tape 25. For example, should the verification fail, central station 49 would merely wait until relay C was next energized, at that time re-transmitting the correct key-signal pattern to be recorded on the subscriber's key tape. In the event that verification fails for several consecutive times, as may be due for example to a broken key tape in the receiver of that particular subscriber, an operator at the central station may be switched to the line to advise the subscriber that his receiver is not in condition to record the key-signal pattern. On the other hand if the verification is good, the sequence of operations at central station 49 is allowed to proceed uninterrupted.

When contact 34 breaks with contact 38, relay D is deenergized and the circuit between pickup head 24 and the telephone lines 50 is broken. At this time, a characteristic tone or alarm is placed on telephone lines 50 by central station 49. When the rotating contact 34 subsequently engages stationary contact 39, the operating coil of relay E is energized and contacts E—1 and E—2 are operated, thereby impressing the alarm signal from central station 49 on the alarm circuit 48 of the subscriber's receiver. This signal may operate to ring a bell, cause a lamp to glow, or provide other indication to the subscriber that the sequence of operations is completed and that the key-signal pattern has been properly recorded. A subscriber, upon receiving this indication, opens switches 31 and 40 and releases reducing gearing and clutch mechanism 33, thereby preventing further operation of the relay circuits. It is, of course, to be understood that alarm circuit 48 may be arranged to trip switches 31 and 40 and clutch mechanism 33 automatically in response to the occurrence of an alarm signal from central station 49; such arrangements are well known and will occur to those skilled in the art.

Each step of the sequence of operations is of an invariable duration which may be made standard for all receivers. Therefore, a time-controlled mechanism may be employed at central station 48 to control the central station sequence of operations; such mechanism may be actuated by receipt of the characteristic tone signalling the beginning of the subscriber's identification signal. To make operation more completely automatic, a different trunk line may be provided for each key-signal pattern, and a schedule indicating which trunk is assigned to each program may be printed in advance in the newspapers to inform subscribers of the correct number to call in order to obtain a desired key-signal pattern.

The system of Figure 1 provides an automatic sequence of operations for identifying the subscriber, conditioniing the signal storage device 25 preparatory to recording the key-signal pattern, recording the key pattern on the signal storage device, verifying the recorded key-signal pattern, and automatically terminating the call. This sequence of operations, in the system of Figure 1, is initiated by equipment associated with the receiver. In certain instances it may be desirable to remove such equipment from the dominion of the subscriber, either to provide more complete control at the central station or to reduce the cost of the additional equipment required at each subscriber's substation. A system in which the sequence of operations is initiated by the central station is illustrated schematically in Figure 2 in which the switching device and associated relays of Figure 1 are replaced by a stepping relay SR and a filter and amplifier unit 51. The stepping relay SR is, in this embodiment, of the five-step type, over-stepping after the fifth step and returning to step number one. Relay SR is caused to step by means of an appropriate characteristic tone or pilot signal applied through filter and amplifier 51 to the step relay solenoid; thus, central station 49 may exercise complete dominion and control over the sequence of operations. It should be noted that amplifier 44 and filter and amplifier 51 should be designed with separate non-overlapping pass bands, and the pilot signal utilized by central station 49 for causing the sequence of operations to progress should have a frequency falling within the pass band of amplifier 51, while the identification signal, the key-signal pattern, and the alarm signal should be of such frequencies as fall within the pass band of amplifier 44.

The automatic sequence of operations of the system of Figure 2 is substantially the same as that of the system of Figure 1. A subscriber wishing to record a key-signal pattern closes switch 31 and engages clutch 33 to set key tape 25 and identification tape 32 in synchronous rotation. The subscriber then places a telephone call from his hand-set 43 to the central station 49. A first pilot signal sent out from central station 49 actuates the stepping relay solenoid closing the contacts numbered 1, thereby placing the subscriber's identification signal on the telephone lines 50. After transmission of the identification signal to the central station 49, a second pilot signal actuates the step relay solenoid to open contacts 1 and close contact 2 thereby applying the horizontal-synchronizing pulses to erasing head 46 for conditioning key tape 25 to record the key-signal pattern. After positive subscriber identification has been completed and the charge for billing has been recorded, and after all previous records on the key tape have been completely erased, a third pilot signal from the central station 49 steps the stepping relay SR to position three wherein contacts 3 are closed, and at the same time the key-signal pattern is placed on the telephone lines 50 by the central station 49. The key signal pattern is then amplified by amplifier 44 and applied to recording head 47 to be stored on key tape 25. A fourth pilot signal from the central station 49 operates relay SR once more, thereby closing contacts 4 and completing the playback or verification circuit. If verification is obtained, a fifth pilot signal closes contacts 5, and an alarm signal sent out from central station 49 operates alarm circuit 48 to notify the subscriber that the correct key-signal pattern is properly recorded on the key tape and that his receiver is conditioned for unscrambled reception of the coded subscription signal to be broadcast.

It is to be understood that all pilot signals placed on telephone lines 50 by central station 48 may be identical in a practical embodiment, the function of each of these signals being merely to cause the sequence of operations to advance one step.

The present invention thus provides in its preferred embodiment an automatic sequence of operations initiated by a simple telephone call placed by the subscriber to the central station. This sequence of operations includes positive subscriber identification, automatic conditioning of the receiver preparatory to reception of the key-signal pattern, automatic recording of the key-signal pattern, verification of the recorded pattern, and automatic notification to the subscriber when the key-signal pattern has been properly recorded.

While the invention has been shown and described in connection with certain preferred embodiments, it is to be understood that numerous variations and modifications may be made, and it is contemplated in the appended claims to cover all such variations and modifications as fall within the true spirit and scope of the invention.

We claim:

1. In a subscription type of signal receiver for utilizing an electrical signal coded in accordance with a predetermined code schedule and received over a first signal channel, and for utilizing a key signal representing said code schedule and received from a central station over a second signal channel: a reproducing device; apparatus for supplying said electrical signal to said reproducing device; a decoding device coupled to said apparatus and responsive to application of said key signal for decoding said coded electrical signal; a signal storage device having stored therein an identification signal; scanning apparatus for scanning said storage device to transmit said identification signal to said central station over said second channel; and a switching device for decoupling said scanning apparatus from said second channel and for effectively coupling said decoding device to said second channel after transmission of said identification signal.

2. In a subscription type of signal receiver for utilizing an electrical signal coded in accordance with a predetermined code schedule and received over a first signal channel, and for utilizing a key signal representing said code schedule and received from a central station over a second signal channel: a reproducing device; apparatus for supplying said electrical signal to said reproducing device; a decoding device coupled to said apparatus and responsive to application of said key signal for decoding said coded electrical signal; a signal storage device having stored therein an identification signal; scanning apparatus for scanning said storage device to transmit said identification signal to said central station over said second channel; and a switching device responsive to a pilot signal from said central station for decoupling said scanning device from said second channel and for effectively coupling said decoding device to said second channel after transmission of said identification signal.

3. In a subscription type of signal receiver for utilizing an electrical signal coded in accordance with a repeating coding schedule and received over a first signal channel for a predetermined program interval, and for utilizing a key signal pattern representing said code schedule and received from a central station over a second signal channel for a time interval short relative to said program interval: a reproducing device; apparatus for supplying said electrical signal to said reproducing device; a decoding device coupled to said apparatus and responsive to an applied decoding signal for decoding said coded electrical signal; a first signal storage device having stored therein an identification signal; scanning apparatus for scanning said first storage device to transmit said identification signal to said central station over said second channel; a second signal storage device; apparatus coupled to said second channel for supplying said key signal pattern to said second storage device to store said key signal therein; a switching device for disabling said scanning apparatus and for initiating said key signal pattern supplying apparatus after transmission to said central station of said identification signal; and a scanning device coupled to said decoding device for recurrently scanning said second storage device during said program interval to derive therefrom, and to supply to said decoding device, in each scanning cycle a decoding signal having a duration equal to that of said code schedule and having characteristic variations representing said code schedule.

4. In a subscription type of signal receiver for utilizing an electrical signal coded in accordance with a repeating coding schedule and received over a first signal channel for a predetermined program interval, and for utilizing a key signal pattern representing said code schedule and received from a central station over a second signal channel for a time interval short relative to said program interval: a reproducing device; apparatus for supplying said electrical signal to said reproducing device; a decoding device coupled to said apparatus and responsive to an applied decoding signal for decoding said coded electrical signal; a first signal storage device having stored therein an identification signal; scanning apparatus for scanning said first storage device to transmit said identification signal to said central station over said second channel; a second signal storage device; means for conditioning said second storage device preparatory to storing said key signal pattern therein; apparatus coupled to said second channel for supplying said key signal pattern to said second storage device to store said key signal pattern therein; a switching device for disabling said scanning apparatus and said conditioning means and for initiating said key signal pattern supplying apparatus after transmission to said central station of said identification signal; and a scanning device coupled to said decoding device for recurrently scanning said second storage device during said program interval to derive therefrom, and to supply to said decoding device, in each scanning cycle a decoding signal having a duration equal to that of said code schedule and having characteristic variations representing said code schedule.

5. In a subscription type of signal receiver for utilizing an electrical signal coded in accordance with a repeating coding schedule and received over a first signal channel for a predetermined program interval, and for utilizing a key signal pattern representing said code schedule and received from a central station over a second signal channel for a time interval short relative to said program interval: a reproducing device; apparatus for supplying said electrical signal to said reproducing device; a decoding device coupled to said apparatus and responsive to an applied decoding signal for decoding said coded electrical signal; a first signal storage device having stored therein an identification signal; scanning apparatus for scanning said first storage device to transmit said identification signal to said central station over said second channel; a second signal storage device; apparatus coupled to said second channel for supplying said key signal pattern to said second storage device to store said key signal pattern therein; a switching device responsive to a pilot signal from said central station for disabling said scanning apparatus and for initiating said key signal pattern supplying apparatus; and a scanning device coupled to said decoding device for recurrently scanning said second storage device during said program interval to derive therefrom, and to supply to said decoding device, in each scanning cycle a decoding signal having a duration equal to that of said code schedule and having characteristic variations representing said code schedule.

6. In a subscription type of signal receiver for utilizing an electrical signal coded in accordance with a repeating coding schedule and received over a first signal channel for a predetermined program interval, and for utilizing a key signal pattern representing said code schedule and received from a central station over a second signal channel for a time interval short relative to said program interval: a reproducing device; apparatus for supplying said electrical signal to said reproducing device; a decoding device coupled to said apparatus and responsive to an applied decoding signal for decoding said coded electrical signal; a first signal storage device having stored therein an identification signal; scanning apparatus for scanning said first storage device to transmit said identification signal to said central station over said second channel; a second signal storage device; means for conditioning said second storage device preparatory to storing said key signal pattern therein; apparatus coupled to said second channel for supplying said key signal pattern to said second storage device to store said key signal pattern therein; a switching device for disabling said scanning apparatus and said conditioning means and for initiating said key signal pattern supplying apparatus after transmission to said central station of said identification signal; and a scanning device coupled to said decoding device for recurrently scanning said second storage device during said program interval to derive therefrom, and to supply to said decoding device, in each scanning cycle a decoding signal having a duration equal to that of said code schedule and having characteristic variations representing said code schedule.

7. In a subscription type of signal receiver for utilizing an electrical signal coded in accordance with a repeating coding schedule and received over a first signal channel for a predetermined program interval, and for utilizing a key signal pattern representing said code schedule and received from a central station over a second signal channel for a time interval short relative to said program interval: a reproducing device; apparatus for supplying said electrical signal to said reproducing device; a decoding device coupled to said apparatus and responsive to an applied decoding signal for decoding said coded electrical signal; a first signal storage device having stored therein an identification signal; scanning apparatus for scanning said first storage device to transmit said identification signal to said central station over said second channel; a second signal storage device; means for conditioning said second storage device preparatory to storing said key signal pattern therein; apparatus coupled to said second channel for supplying said key signal pattern to said second storage to store said key signal pattern therein; a switching device for disabling said scanning apparatus and said conditioning means and for initiating said key signal supplying apparatus after transmission to said central station of said identification signal; apparatus for disabling said key signal pattern supplying apparatus and for transmitting the key signal stored in said second storage device to said central station for verification; and a scanning device coupled to said decoding device for recurrently scanning said second storage device during said program interval to derive therefrom, and to supply to said decoding device, in each scanning cycle a decoding signal having a duration equal to that of said code schedule and having characteristic variations representing said code schedule.

8. In a subscription type of television receiver for utilizing a composite television signal coded in accordance with a repeating code schedule, including synchronizing-signal components and video-frequency components, and receiver over a first signal channel for a predetermined program interval, and for utilizing a key signal pattern received over a second signal channel from a central station for a time interval short relative to said program interval: an image reproducing device having an associated scanning system; apparatus for supplying said composite television signal to said reproducing device and to said scanning system; a decoding device coupled to said apparatus and responsive to an applied decoding signal for decoding said coded television signal; a first signal storage device having stored therein an identification signal; scanning apparatus for scanning said first storage device to transmit said identification signal to said central station over said second channel; a second signal storage device; apparatus coupled to said second channel for supplying said key signal pattern to said second storage device to store said key signal pattern therein; a switching device for disabling said scanning apparatus and for initiating said key signal pattern supplying apparatus after transmission to said central station of said identification signal; and a scanning device coupled to said decoding device for recurrently scanning said second storage device during said program interval to derive therefrom, and to suppy to said decoding device, in each scanning cycle a decoding signal having a duration equal to that of said code schedule and having characteristic variations representing said code schedule.

9. In a subscription type of television receiver for utilizing a composite television signal coded in accordance with a repeating code schedule, including synchronizing-signal components and video-frequency components, and received over a first signal channel for a predetermined program interval, and for utilizing a key signal pattern received over a second signal channel from a central station for a time interval short relative to said program interval: an image reproducing device having an associated scanning system; apparatus for supplying said composite television signal to said reproducing device and to said scanning system; a decoding device coupled to said apparatus and responsive to an applied decoding signal for decoding said coded television signal; a first signal storage device having stored therein an identification signal; scanning apparatus for scanning said first storage device to transmit said identification signal to said central station over said second channel; a second signal storage device; means for conditioning said second storage device preparatory to storing said key signal pattern therein; apparatus coupled to said second channel for supplying said key signal pattern to said second storage device to store said key signal pattern therein; a switching device for disabling said scanning apparatus and said conditioning means and for initiating said key signal pattern supplying apparatus after transmission to said central station of said identification signal; and a scanning device coupled to said decoding device for recurrently scanning said second storage device during said program interval to derive therefrom, and to supply to said decoding device, in each scanning cycle a decoding signal having a duration equal to that of said code schedule and having characteristic variations representing said code schedule.

10. In a subscription type of television receiver for utilizing a composite television signal coded in accordance with a repeating code schedule, including synchronizing-signal components and video-frequency components, and received for a predetermined program interval, and for utilizing a key signal pattern received over a second signal channel from a central station for a time interval short relative to said program interval: an image reproducing device having an associated scanning system; apparatus for supplying said composite television signal to said reproducing device and to said scanning system; a decoding device coupled to said apparatus and responsive to an applied decoding signal for decoding said coded television signal; a first signal storage device having stored therein an identification signal; scanning apparatus for scanning said first storage device to transmit said identification signal to said central station over said second channel; a second signal storage device; means for conditioning said second storage device preparatory to storing said key signal pattern therein; apparatus coupled to said second channel for supplying said key signal pattern to said second storage device to store said key signal pattern therein; a switching device responsive to a first pilot signal from said central station for disabling said scanning apparatus and said conditioning means and for initiating said key signal pattern supplying apparatus; apparatus for disabling said key signal supplying apparatus and for transmitting the key signal pattern stored in said second storage device to said central station for verification; an alarm device responsive to a second pilot signal from said central station to indicate verification of said recorded key signal pattern; and a scanning device coupled to said decoding device for recurrently scanning said second storage device during said program interval to derive therefrom, and to supply to said decoding device, in each scanning cycle a decoding signal having a duration equal to that of said code schedule and having characteristic variations representing said code schedule.

11. In a subscription type of television receiver for utilizing a composite television signal coded in accordance with a repeating code schedule, including synchronizing-signal components and video-frequency components, and received over a first signal channel for a predetermined program interval, and for utilizing a key signal pattern received over a second signal channel from a central station for a time interval short relative to said program interval: an image reproducing device having an associated scanning system; apparatus for supplying said composite television signal to said reproducing device and to said scanning system; a decoding device coupled to said apparatus and responsive to an applied decoding signal for decoding said coded television signal; a first signal storage device having stored therein an identification signal; scanning apparatus for scanning said first storage device to transmit said identification signal to said central station over said second channel; a second signal storage device; means for conditioning said second storage device preparatory to storing said key signal pattern therein; apparatus coupled to said second channel for supplying said key signal pattern to said second storage device to store said key signal pattern therein; a switching device for disabling said scanning apparatus and said conditioning means and for initiating said key signal pattern supplying apparatus after transmission to said central station of said identification signal; and a scanning device coupled to said decoding device for recurrently scanning said second storage device during said program interval in predetermined phase with respect to said synchronizing-signal components to derive from said second storage device, and to supply to said decoding device, in each scanning cycle a decoding signal having a duration equal to that of said code schedule and having characteristic variations representing said code schedule.

ALEXANDER ELLETT.
MALCOLM M. HUBBARD.

REFERENCES CITED

The following references are of record in the file of this patent:

UNITED STATES PATENTS

| Number | Name | Date |
|---|---|---|
| 2,343,290 | Francis | Mar. 7, 1944 |
| 2,405,569 | Fitch | Aug. 13, 1946 |
| 2,456,733 | Potts | Dec. 21, 1948 |